Nov. 13, 1928.    H. W. HANAN    1,691,390
SULKY
Filed Oct. 3, 1924
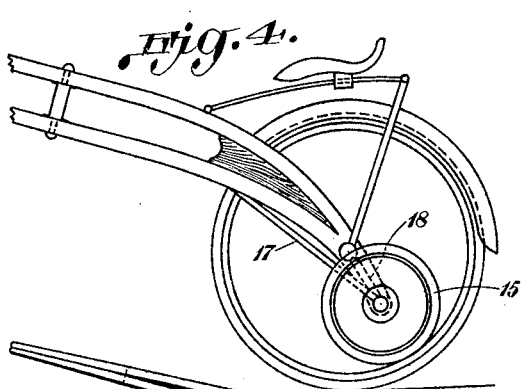
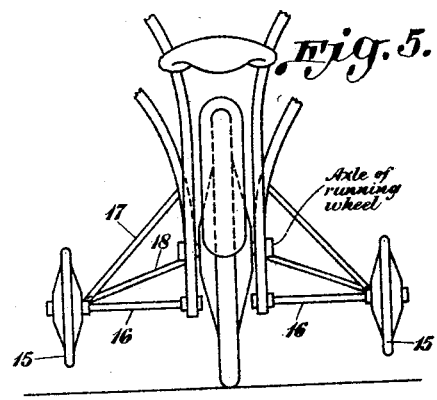
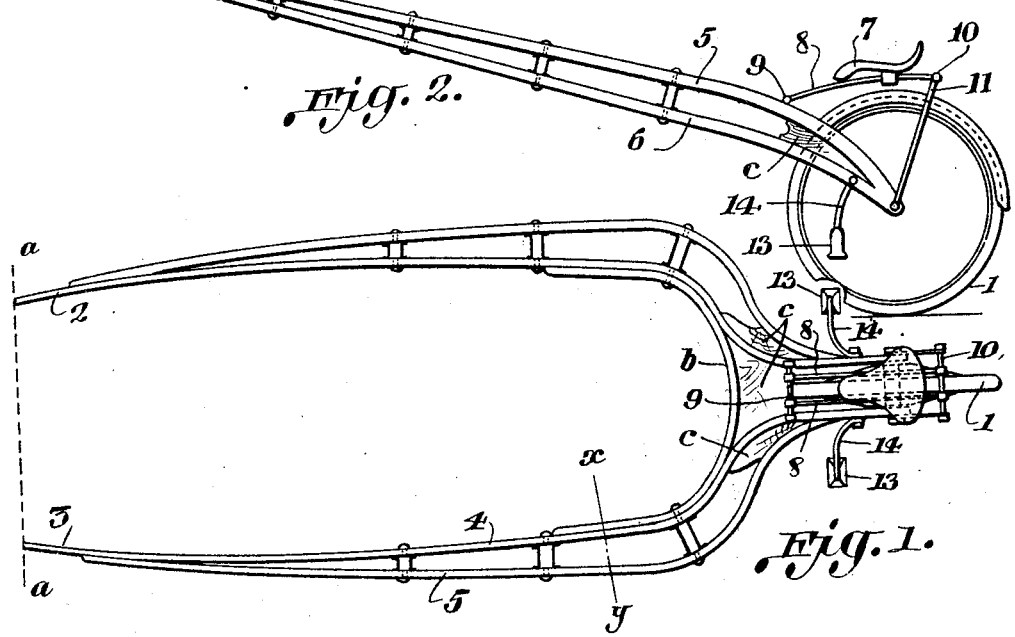
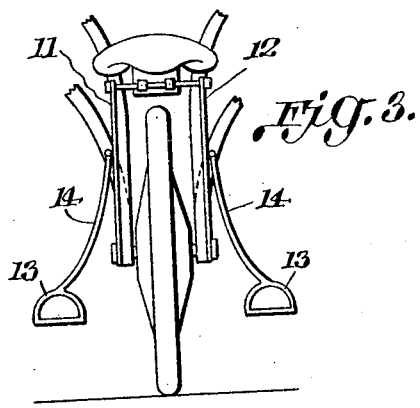
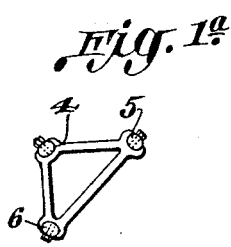
INVENTOR
*H. W. Hanan*
BY
*John McGlone*
ATTORNEY Patented Nov. 13, 1928.

1,691,390

UNITED STATES PATENT OFFICE.

HERBERT WILMER HANAN, OF BROOKLYN, NEW YORK.

SULKY.

Application filed October 3, 1924. Serial No. 741,394.

This invention relates to a sulky of the type used in racing and especially to a method and means for reducing friction and wind resistance therein.

A two-wheeled sulky of the type now used in racing presents considerable area to the wind and thereby reduces the speed of the vehicle, in spite of the fact that it is only an open framework of light metallic parts. Furthermore, the speed is reduced by the friction losses caused by the wheels, which losses arise not only from the axle bearings, but also from the unevenness of the surface of the road over which the vehicle is being drawn. The speed is also reduced by the wind resistance of the spokes of each wheel.

My invention consists in minimizing the loss in speed due to wind resistance by reducing the area of the sulky framework that is presented to the wind, and, also, in reducing the friction created by the wheels. These results are obtained largely by the employment of a single running wheel in combination with a framework of novel design, the sulky being characterized not only by lightness but also by strength and rigidity.

The invention will be clearly understood from the following description when read in connection with the attached drawing, of which Figure 1 is a plan view of the sulky embodying my invention; Fig. 1$^a$ is a cross-section of the shaft structure at $x$—$y$ of Fig. 1; Figs. 2 and 3 are, respectively, side and rear elevations of the sulky; Fig. 4 is a fragment of the side view as shown in Fig. 2 but embodying a modification in the form of a stabilizing wheel, and Fig. 5 is a rear view of the sulky as thus modified.

Figure 1, which is a plan view of the sulky, comprises a single wheel 1, which will be designated the running wheel in order to distinguish it from the so-called stabilizing wheels shown in Figs. 4 and 5. This running wheel, which may be of the disc type or of the ordinary bicycle type, is supported by an axle, the bearings for which are located in the members constituting the rear end of the frame of the sulky. Any form of bearing may be used, but, in order to reduce friction a ball or roller bearing would be preferable.

While the framework of the sulky comprises what may be termed the body and also the shafts, no clear line of division exists structurally between these parts. The members that form the shafts are so bent and proportioned as to form the body, thus making the framework of the sulky a unitary, rigid structure. The shafts 2 and 3 which, for the purpose of description may be considered as that part of the frame extending from the line $a$—$a$ to the point $b$, should be of such length that the hind feet of the horse will not come in contact with the running wheel 1. Each shaft is made up of a plurality of members extending from a point near the forward end of the shaft to the rear of the said shaft and continuing on to form the body of the sulky. The members are bound closely together near the forward part of the shaft, and are spread apart as they extend away from the front ends of the shafts and are maintained thus spread throughout the body portion but are gradually brought together at or near the point where the axle of the running wheel is supported. A clear idea of the form of the shafts may be obtained from Fig. 1$^a$, which is a cross-section of the shaft 3 at the point $x$—$y$. As will be seen, the shaft is made up of three members, designated 4, 5 and 6. In the plan view, which Fig. 1 represents, only the members 4 and 5 are shown but, as will be seen from Fig. 1$^a$, another member 6 extends in substantially the same vertical plane as the member 4. While any of a number of devices may be used for holding the members apart, a desirable form consists of a spreader having three sides and having sockets at the corners thereof which conform to the surface of the members which are braced apart. A bolt forming part of each socket extends through the member, and is secured by a nut on the outer end. Other ways within the scope of this invention will suggest themselves to any one skilled in the art. The members 4, 5 and 6 should be proportioned and arranged substantially as shown in Figs. 1 and 2 of the drawing. The members gradually converge and are firmly held together at the point where the axle of the running wheel is connected to the body. It will be seen that by means of a trussed structure, such as shown in Fig. 1$^a$, the framework offers great resistance to bending and thus a high degree of rigidity or stiffness of the entire framework is obtained. None of the single wheeled sulkies of the prior art shows any arrangement for rendering the entire framework rigid from the forward end of the shafts to the running wheel, and for this reason it is believed that such vehicles were unsuccessful. While I have shown the use of wood for the purpose of bracing the body at the points c, it is to be understood that other forms of bracing could be used as, for example, a latticework of metal, such as the light but strong alloys used in airplane construction. The saddle 7 may preferably be supported by a springy structure in the manner shown schematically in Figs. 1 and 2. This saddle is movably supported by two rods 8 which have the requisite springiness to render the saddle free from shocks and vibrations. These rods are supported at their two ends by cross members 9 and 10, the forward cross member 9 being supported by the members 4 of the framework of the sulky and the rear cross member 10 being supported by the struts 11 and 12, extending to and connected with the framework at or near the point of support of the rear axle, as shown clearly in Figs. 2 and 3. Vertical adjustment of the saddle may also be provided in well known ways, but it is felt that, in general, the horizontal adjustment will suffice. While a saddle is mentioned, it is to be understood that any form of seat may be used in connection with this sulky.

Stirrups 13 are supported by the curved members 14 which are attached to the lower member 6 of the frame of the sulky, as shown in Figs. 1 to 3. The arrangement of the stirrup and its mode of support shown in the drawing is merely to illustrate a possible way and constitutes no limitation upon the invention since other ways of supporting the stirrup will readily occur to one familiar with the art of sulky building. While stirrups may be put between the members 4 and 5 of the frame, thus occupying a position similar to the stirrups of the sulkies now in use, it is believed that it is better practice to position the stirrups as shown in the drawing because this tends to keep the center of gravity of the sulky and driver closer to the ground and thereby increases the stability.

Figures 4 and 5 show a modified form of sulky having not only a single running wheel but also stabilizing wheels 15 rigidly supported at a fixed distance upon both sides of the running wheel. The stabilizing wheels are carried by axles 16 that extend from the framework of the sulky. In the form of sulky shown in Figs. 1 to 3, the framework is so proportioned that the axle of the running wheel is supported at the rear extremity of the framework. In order to provide for the attachment of the stabilizing wheels, this framework may be extended beyond the point where the axle of the running wheel is supported so as to provide a bearing surface for supporting the axles of the stabilizing wheels. This is clearly shown in Figs. 4 and 5. In order to provide requisite strength and rigidity, struts 17 and 18 extend from the body of the framework to the outer ends of the axles carrying the stabilizing wheels. These wheels are of such size and the axles that carry them are at such a distance from the ground that neither wheel will come in contact with the ground until the sulky has turned to such an angle, due to the curvature of the track, as might tend to render the sulky unstable. As is well known, in rounding a curve at high speed the horse and sulky will lean toward the inside of the curve. It may be possible that under certain conditions the degree to which the sulky leans may be such as to render it unstable. This point may be determined by experiment or practical experience and the stabilizing wheels should be so positioned that they will come in contact with the ground only when the running wheel turns to an angle of that degree.

While I have described the axles of the stabilizing wheels as being rigidly fastened to the framework and rigidly trussed, I do not want to limit my invention to such a structure. It may be desirable to have a flexible, e. g., a hinged connection between each axle and the framework and also to have springs in the struts extending from the outer ends of each axle to the framework of the sulky, which would be compressed by an upward movement of the axle. Such an arrangement would act in the nature of a shock absorber to reduce the strain upon the framework whenever one of the stabilizing wheels came in contact with the ground. The suggested modification is, of course, only one of many possible arrangements for supporting the stabilizing wheels.

In Fig. 5 I have omitted showing the supporting members for the saddle and also the stirrups in order to avoid complexity in the drawing but the saddle and stirrups will be supported in the sulky having stabilizing wheels in substantially the same manner in which they are in Fig. 3.

It will be apparent from the foregoing description that a sulky of the character described possesses a higher degree of rigidity and stiffness than any known hitherto in the art. Such a structure, especially of the form shown in Figs. 1 to 3, reduces the losses in speed due to the mechanical friction of the rotating parts and also that due to wind resistance which is offered by the exposed parts of the body and by the spokes of the running wheel.

While this invention has been disclosed as embodied in a particular form it is to be understood that the form may be varied without going beyond the scope of the claims. For example, the framework is not necessarily limited to the triangular truss structure shown in detail in Fig. 1ª since other forms of structure may well be used to attain the object of the invention.

What is claimed is:

1. A sulky having a single wheel and a framework comprising shafts and a body supported by the said wheel, each shaft being made up of a plurality of spaced members, of which at least one lies outside the plane of the others.

2. A sulky having a single wheel and a framework comprising shafts and a body supported by the said wheel, each shaft being made up of a plurality of spaced members, of which at least one lies outside the plane of the others, and both shafts being fixedly held together.

3. A sulky having a single wheel and a framework supported thereby, the said framework having a seat and shafts, each shaft comprising a plurality of members, of which at least one lies outside the plane of the others, the said members extending from a point near the forward end of the shaft to the point of support of the said wheel, and being closely bound together near their extremities, but spread apart between their extremities so as to substantially prevent bending of the framework.

4. A sulky frame consisting of a plurality of spaced members, of which at least one lies outside the plane of the others, the said members being so proportioned and designed as to form shafts and a saddle-supporting body, and being so arranged as to render the frame substantially rigid.

5. A sulky shaft made up of more than two substantially similar members so spaced apart and fixedly held as to render the shaft substantially rigid.

6. A sulky frame work consisting of shafts and a body formed of a plurality of members, the members that constitute each of the said shafts being shaped and proportioned to constitute also one half of the body, means to rigidly connect and hold together the said halves and a single running wheel supported by the said body.

7. A sulky framework comprising shafts and a body, each shaft and one half of the body consisting of a plurality of members rigidly and closely bound together near the forward end of the shaft, but spreading apart as they extend rearwardly and being held rigidly apart at fixed distances, then converging at the end of the body.

8. A sulky having a framework consisting of shafts and a body formed by a plurality of members of triangular truss formation, a seat and a stirrup supported by said body, and a running wheel rotatably connected with said framework substantially below said seat.

9. A sulky having a framework consisting of shafts and a body formed by a plurality of members of triangular truss formation, a seat and a stirrup supported by said body, a running wheel rotatably connected with said framework substantially below said seat, and a stabilizing wheel upon each side of the running wheel, supported by the said framework.

10. In a sulky shaft the combination with a plurality of substantially similarly shaped members, of a plurality of spreading devices adapted to hold the said members in fixed relation to each other, a cross-section of the said shaft being substantially triangular.

11. A sulky shaft comprising a plurality of similar longitudinal members held rigidly apart at a fixed distance, each of the said members forming a corner of a polygon constituting a cross-section of the said shaft.

12. A sulky shaft comprising a plurality of similar longitudinal members, rigidly held apart at a fixed distance, each of the said members lying at the apex of a triangle constituting a cross-section of the said shaft.

13. In a sulky shaft the combination with a plurality of similar longitudinal members, closely bound together at or near one end of the said shaft and being gradually spread apart as they extend therefrom, of a plurality of spreading devices of different sizes, each adapted to hold the said members rigidly apart at a fixed distance, in such manner that the cross-section of the said shaft is a polygon.

14. A sulky shaft of triangular truss formation comprising a plurality of members closely bound together near one end of the said shaft and spreading apart as they extend therefrom, and a plurality of triangular spreaders adapted to hold the said members rigidly apart.

15. In a sulky the combination with a plurality of similar longitudinal members closely bound together at or near their ends, and spread apart between the said ends, of means for rigidly holding the said members apart, a cross-section of the framework being a polygon with each of the said members at a corner thereof.

16. A sulky comprising a framework and a running wheel rotably mounted upon the said framework, the said wheel lying within a vertical plane through the longitudinal axis of the framework, said framework comprising the shafts of the body of the said sulky being of triangular truss formation.

17. In a sulky the combination with two shafts of a single running wheel lying in a vertical plane through the longitudinal axis of the shafts, each of the said shafts being made up of a plurality of members closely bound together at or near the forward end thereof and spreading apart as they extend rearwardly therefrom forming a trussed structure of substanially polygonal form with the said members at the corners thereof, the said members of each shaft bending inwardly at the rear of the shafts, and certain of said members extending downwardly and converging at or near the point of support of the said wheel.

18. In a sulky the combination with a framework of a running wheel lying substantially in a vertical plane through the longitudinal axis of the said framework and rotably supported near the rear end of the said framework, the said framework including two shafts, each made up of a plurality of members closely bound together at or near the forward end thereof and spreading apart as they extend rearwardly therefrom forming a trussed structure of substantially polygonal form with the said members at the corners thereof, the said members of each shaft bending inwardly at the rear of the shafts, and certain of said members extending downwardly and converging at or near the point of support of the said wheel.

19. In a sulky the combination with a framework of a running wheel rotatably supported near the rear end of the said framework in a vertical plane through the longitudinal axis of the said framework, the said framework including two shafts, each comprising a plurality of members closely bound together near the forward end thereof and gradually spreading apart as they extend rearwardly, the said members of each shaft being bent inwardly toward the said longitudinal axis, thence downwardly and converging at the point of support of the said wheel, each of the said shafts having means to maintain the said members rigidly separated, and the said framework having means to hold the shaft members rigidly together between the point where the said members bend inwardly and the point of support of the said running wheel.

In testimony whereof, I have signed my nme to this specification this 2d day of October, 1924.

HERBERT WILMER HANAN.